(12) United States Patent
Nagahama et al.

(10) Patent No.: US 11,429,067 B2
(45) Date of Patent: Aug. 30, 2022

(54) ELECTRONIC TIMEPIECE, MOVEMENT, AND MOTOR CONTROL CIRCUIT

(71) Applicant: Seiko Epson Corporation, Tokyo (JP)

(72) Inventors: Reiko Nagahama, Shiojiri (JP); Takashi Kawaguchi, Shiojiri (JP)

(73) Assignee: Seiko Epson Corporation

( * ) Notice: Subject to any disclaimer, the term of this patent is extended or adjusted under 35 U.S.C. 154(b) by 258 days.

(21) Appl. No.: 16/810,919

(22) Filed: Mar. 6, 2020

(65) Prior Publication Data
US 2020/0285200 A1    Sep. 10, 2020

(30) Foreign Application Priority Data

Mar. 8, 2019  (JP) .............................. JP2019-042313

(51) Int. Cl.
*H02P 8/02*     (2006.01)
*H02P 8/12*     (2006.01)
*H02P 8/28*     (2006.01)
*H02P 6/15*     (2016.01)
*G04C 3/14*     (2006.01)

(52) U.S. Cl.
CPC ................ *G04C 3/143* (2013.01); *H02P 8/02* (2013.01); *H02P 8/12* (2013.01); *H02P 8/28* (2013.01)

(58) Field of Classification Search
CPC ...... H02P 8/02; H02P 8/12; H02P 8/28; H02P 6/28; H02P 6/085; H02P 8/22; H02P 6/15; G04C 3/143; G04C 3/14; G04C 9/08
See application file for complete search history.

(56) References Cited

U.S. PATENT DOCUMENTS

| | | | | |
|---|---|---|---|---|
| 4,361,410 A * | 11/1982 | Nakajima | ............... | G04C 3/143 318/696 |
| 4,542,329 A * | 9/1985 | Tu Xuan | ................ | G04C 3/143 310/49.24 |
| 5,166,590 A * | 11/1992 | Tu | ........................... | G04C 3/143 318/685 |
| 5,247,235 A * | 9/1993 | Tu | ........................... | G04C 3/143 318/400.04 |
| 5,581,519 A * | 12/1996 | Hara | ..................... | G04C 10/00 368/64 |
| 5,774,426 A * | 6/1998 | Tu | ............................. | H02P 8/16 318/696 |
| 6,025,690 A * | 2/2000 | Guerin | ..................... | H02P 8/02 318/685 |

(Continued)

FOREIGN PATENT DOCUMENTS

| | | |
|---|---|---|
| JP | H02-33108 B2 | 7/1990 |
| JP | 2009-542186 A | 11/2009 |

*Primary Examiner* — Thai T Dinh
(74) *Attorney, Agent, or Firm* — Harness, Dickey & Pierce, P.L.C.

(57) ABSTRACT

An electronic timepiece enables driving by appropriate drive conditions even when the load on a motor changes. The electronic timepiece includes a motor having a coil; a driver that is controlled to an on state supplying drive current to the coil, and an off state not supplying the drive current; a driver controller configured to control the driver to the on state or the off state based on a control parameter and current value through the coil; and a control parameter setter configured to maintain or change the control parameter based on the on state or the off state control state of the driver controller.

9 Claims, 15 Drawing Sheets

(56) References Cited

U.S. PATENT DOCUMENTS

| | | | | |
|---|---|---|---|---|
| 6,107,772 A | * | 8/2000 | Liu | ............... H02P 25/089 |
| | | | | 318/254.2 |
| 2010/0001673 A1 | | 1/2010 | Cardoletti et al. | |
| 2017/0277130 A1 | * | 9/2017 | Saito | ............... G04C 3/143 |

* cited by examiner

ELECTRONIC TIMEPIECE, MOVEMENT, AND MOTOR CONTROL CIRCUIT

BACKGROUND

1. Technical Field

The present invention relates to an electronic timepiece, a movement, and a motor control circuit.

The present application claims priority based on and incorporates by reference the entire contents of Japan Patent Application No. 2019-042313 filed in Japan on Mar. 8, 2019.

2. Related Art

JP-T-2009-542186 describes a technique for controlling rotation of a motor by turning the supply of current to the coil of the motor off when the current flow through the coil exceeds an upper threshold, and on when the current flow goes below a lower threshold, and estimating the position of the rotor of the motor from the on time that power supply continues and the off time during which the power supply is continuously off.

However, the load on the motor may vary due, for example, to deterioration of the oil used in the motor or change in the temperature of the operating environment in which the motor is used. The control technique described in JP-T-2009-542186 does not account for such load changes, and the motor may therefore not be driven under the appropriate drive conditions. As a result, when the load on the motor is low, the motor may be driven with high power consumption and unnecessary power may be consumed, or the motor may be driven with low power consumption when the load on the motor is high and the speed of the motor may slow.

SUMMARY

An electronic timepiece according to one aspect of the present disclosure has a motor having a coil; a driver that is controlled to an on state supplying drive current to the coil, and an off state not supplying the drive current; a driver controller configured to control the driver to the on state or the off state based on a control parameter and current value through the coil; and a control parameter setter configured to maintain or change the control parameter based on the on state or the off state control state of the driver controller.

In an electronic timepiece according to another aspect of the present disclosure, the driver controller includes a minimum current detector configured to compare the current value and a minimum current threshold value and detect whether or not the current value is below the minimum current threshold value, and controls the driver from the off state to the on state based on the detection result from the minimum current detector; and the control parameter setter maintains or changes the control parameter based on an off time, which is a continuous time of the off state of the driver.

In an electronic timepiece according to another aspect of the present disclosure, the driver controller includes a maximum current detector configured to compare the current value and a maximum current threshold value and detect whether or not the current value exceeds the maximum current threshold value, and controls the driver from the on state to the off state based on the detection result from the maximum current detector; and the control parameter setter maintains or changes the control parameter based on an on time, which is a continuous time of the on state of the driver.

In an electronic timepiece according to another aspect of the present disclosure, the control parameter setter maintains or changes the control parameter based on an elapsed time from when the driver controller starts supplying the drive current to the driver, the elapsed time corresponding to a change polarity condition for changing the polarity of the drive current.

An electronic timepiece according to another aspect of the present disclosure may also have a maximum current detector configured to compare a current value through the coil and a maximum current threshold value, and detect whether or not the current value exceeds the maximum current threshold value, wherein the control parameter is the maximum current threshold value.

An electronic timepiece according to another aspect of the present disclosure may also have a minimum current detector configured to compare a current value through the coil and a minimum current threshold value, and detect whether or not the current value is less than the minimum current threshold value, wherein the control parameter is the minimum current threshold value.

In an electronic timepiece according to another aspect of the present disclosure, the control parameter is a change polarity condition for changing the polarity of the drive current.

In an electronic timepiece according to another aspect of the present disclosure, the driver controller includes a maximum current detector configured to compare a current value through the coil and a maximum current threshold value, and detect whether or not the current value exceeds the maximum current threshold value, and a minimum current detector configured to compare a current value through the coil and a minimum current threshold value, and detect whether or not the current value is below the minimum current threshold value, controls the driver to the off state when the maximum current detector detects the current value exceeds the maximum current threshold value, controls the driver to the on state when the minimum current detector detects the current value is less than the minimum current threshold value, changes the polarity of the drive current when an on time, which is a continuous time of the on state of the driver, or an off time, which is a continuous time of the off state of the driver, corresponds to a previously set change polarity condition, the control parameter is the maximum current threshold value or the minimum current threshold value; and the control parameter setter maintains or changes the control parameter based on the on time or the off time.

In an electronic timepiece according to another aspect of the present disclosure, the driver controller includes a maximum current detector configured to compare a current value through the coil and a maximum current threshold value, and detect whether or not the current value exceeds the maximum current threshold value, and a minimum current detector configured to compare a current value through the coil and a minimum current threshold value, and detect whether or not the current value is below the minimum current threshold value, controls the driver to the off state when the maximum current detector detects the current value exceeds the maximum current threshold value, controls the driver to the on state when the minimum current detector detects the current value is less than the minimum current threshold value, changes the polarity of the drive current when an on time, which is a continuous time of the on state of the driver, or an off time, which is a continuous time of the off state of the driver, corresponds to a previously set change polarity condition, and an elapsed time from when the driver controller starts supplying the drive current to the driver until the change polarity condition is met is greater than or equal to a threshold value, the control parameter is the maximum current threshold value or the minimum current threshold value; and the control parameter setter maintains or changes the control parameter based on the on time or the off time.

In an electronic timepiece according to another aspect of the present disclosure, the control parameter setter increases the maximum current threshold value when the on time or the off time corresponds to the previously set change polarity condition, and the elapsed time is less than a threshold value.

In an electronic timepiece according to another aspect of the present disclosure, the control parameter setter decreases the maximum current threshold value when a count of the on states and the off states until the elapsed time is greater than or equal to a threshold value is less than a first count, and increases the maximum current threshold value when a count of the on states and the off states until the elapsed time is greater than a second count, which is set greater than or equal to the first count.

In an electronic timepiece according to another aspect of the present disclosure, the driver controller changes the polarity of the drive current and controls the driver each step after a start signal to start driving the motor is input; the control parameter setter sets the control parameter of the second and following steps based on the on state or the off state in control of the first step, and the control parameter setter is operated at a specific time interval and executes a setting process of the control parameter until a stop signal to stop driving the motor is input.

Another aspect of the present disclosure is a movement including: a motor having a coil; a driver that is controlled to an on state supplying drive current to the coil, and an off state not supplying the drive current; a driver controller configured to control the driver to the on state or the off state based on a control parameter and current value through the coil; and a control parameter setter configured to maintain or change the control parameter based on the on state or the off state control state of the driver controller.

Another aspect of the present disclosure is a motor control circuit including: a driver that is controlled to an on state supplying drive current to a coil of a motor, and an off state not supplying the drive current; a driver controller configured to control the driver to the on state or the off state based on a control parameter and current value through the coil; and a control parameter setter configured to maintain or change the control parameter based on the on state or the off state control state of the driver controller.

Other objects and attainments together with a fuller understanding of the invention will become apparent and appreciated by referring to the following description and claims taken in conjunction with the accompanying drawings.

DESCRIPTION OF EMBODIMENTS

An electronic timepiece 1 according a first embodiment of the present disclosure is described below with reference to the accompanying figures.

Figure 1:
FIG. 1 is a front view of an electronic timepiece according to the first embodiment.
Figure 2:
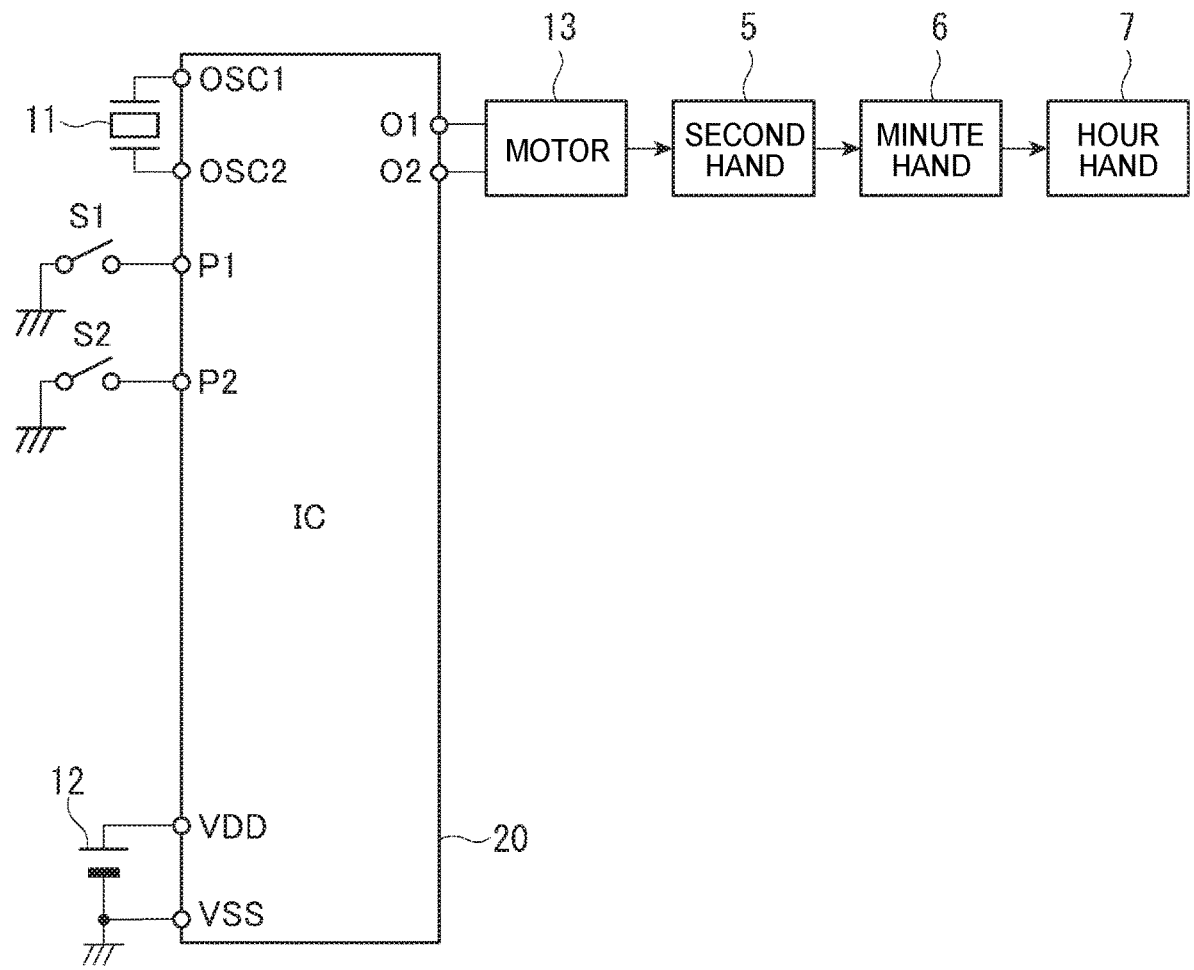
FIG. 2 is a circuit diagram showing the circuit configuration of the electronic timepiece according to the first embodiment.

As shown in FIG. 1, the electronic timepiece 1 in this embodiment is a wristwatch typically worn on the wrist of the user, and has an external case 2, a round dial 3, a movement not shown, a secondhand 5, a minute hand 6, and an hour hand 7 that are hands driven by a motor 13 included in the movement as shown in FIG. 2, and a crown 8 and a button 9 as operating members.

Circuit Configuration of the Electronic Timepiece

As shown in FIG. 2, the electronic timepiece 1 has a crystal oscillator 11 as a signal source, a battery 12 as a power supply, a switch S1 that turns on and off according to operation of the button 9, a switch S2 that turns on and off in response to the crown 8 being pulled out, a motor 13, and an IC chip 20.

The motor 13 is a two pole, single phase stepper motor used in electronic timepieces, and as described below is driven by drive current output from the output terminals O1 and O2 of the IC chip 20.

The second hand 5, minute hand 6, and hour hand 7 move in conjunction with a wheel train not shown, are driven by the motor 13, and respectively indicate the second, minute, and hour. Note that in this embodiment a single motor 13 drives the second hand 5, minute hand 6, and hour hand 7, but the electronic timepiece 1 may have multiple motors such as a motor that drives the secondhand 5, and another motor that drives the minute hand 6 and hour hand 7.

As shown in FIG. 2, the IC chip 20 has connection terminals OSC1 and OSC2 to which the crystal oscillator 11 is connected, input/output terminals P1 and P2 to which the switches S1 and S2 are connected, power supply terminals VDD and VSS to which the battery 12 is connected, and output terminals O1 and O2 to which the coil 130 of the motor 13 is connected.

Note that in this embodiment the positive electrode of the battery 12 connects to the high potential power supply terminal VDD, the negative electrode connects to the low potential power supply terminal VSS, and the low potential power supply terminal VSS is set to ground.

The crystal oscillator 11 is driven by an oscillation circuit 21 described below, and outputs an oscillation signal.

The battery 12 may be a primary battery or a storage battery. If the battery 12 is a storage battery, it may be charged by a solar cell not shown, for example.

Switch S1 in this example operates in conjunction with operation of the button 9 disposed near the 2:00 position of the electronic timepiece 1, turns on when the button 9 is depressed, and is off when the button 9 is not depressed.

Switch S2 is a slide switch that operates in conjunction with the crown 8 being pulled out. In this embodiment, the switch S2 is on when the crown 8 is pulled out to the first stop, and is off when the crown 8 is at the 0 stop.

IC Chip Configuration

Figure 3:
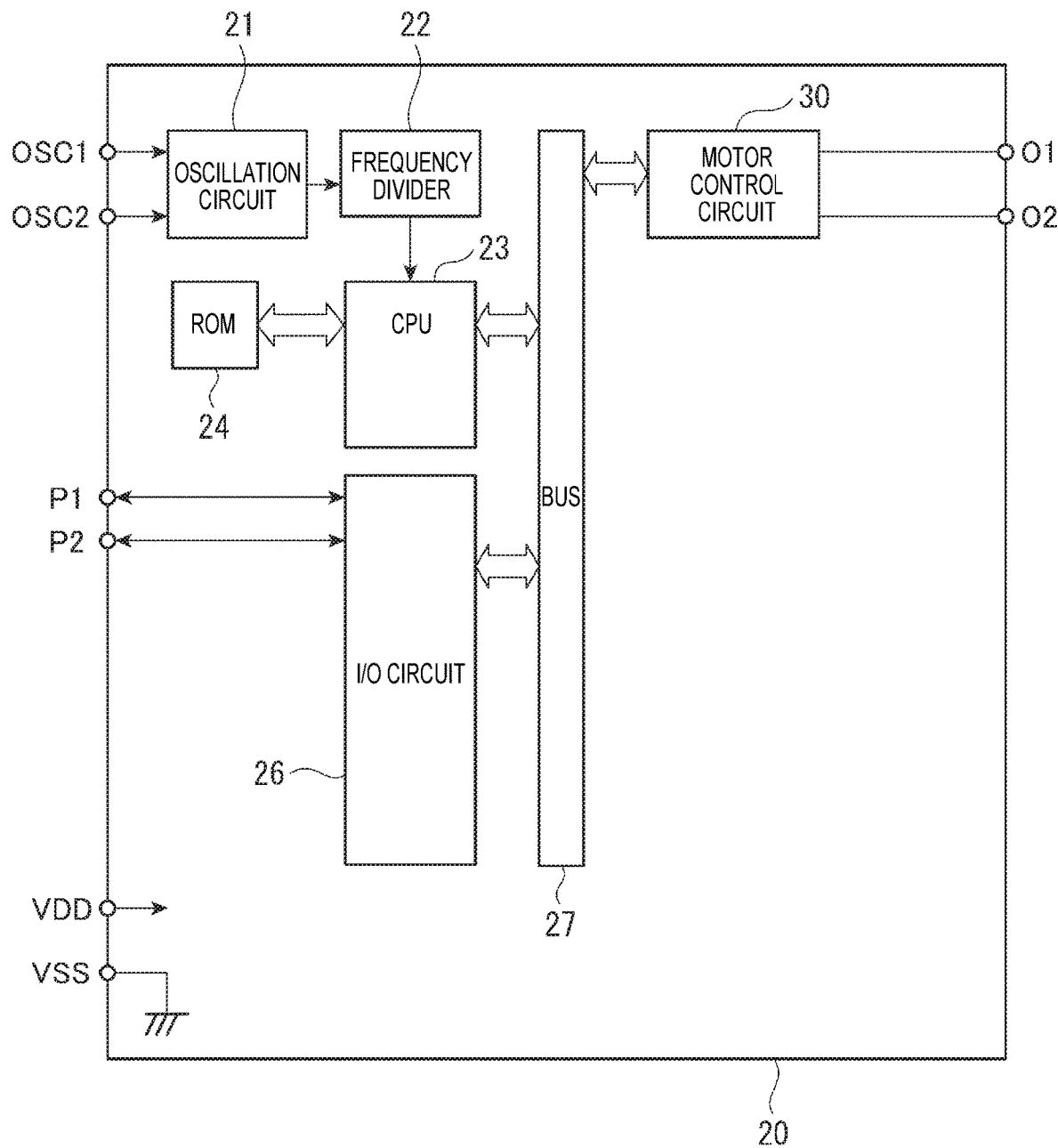
FIG. 3 illustrates the configuration of an IC chip in the electronic timepiece according to the first embodiment.

As shown in FIG. 3, the IC chip 20 includes an oscillation circuit 21, frequency divider 22, CPU 23 for controlling the electronic timepiece 1, ROM 24, an input/output circuit 26, a bus 27, and a motor control circuit 30. CPU is an abbreviation for Central Processing Unit, and ROM is an abbreviation for Read Only Memory.

The oscillation circuit 21 causes the crystal oscillator 11, which is a reference signal source, at a high frequency, and outputs an oscillation signal at a specific frequency produced by the high frequency oscillation to the frequency divider 22.

The frequency divider 22 frequency divides the output of the oscillation circuit 21, and supplies a timing signal, that is, a clock signal, to the CPU 23.

The ROM 24 stores programs executed by the CPU 23. In this embodiment, the ROM 24 stores, for example, a program for executing a basic timekeeping function.

The CPU 23 executes programs stored in the ROM 24 to execute specific functions.

The input/output circuit 26 outputs the states of the input/output terminals P1 and P2 to the bus 27.

The bus 27 is used for data transfers between the CPU 23, input/output circuit 26, and motor control circuit 30.

The motor control circuit 30A supplies drive current to the coil 130 of the motor 13 and controls driving the motor 13 according to commands input from the CPU 23 through the bus 27.

Motor Control Circuit Configuration

Figure 4:
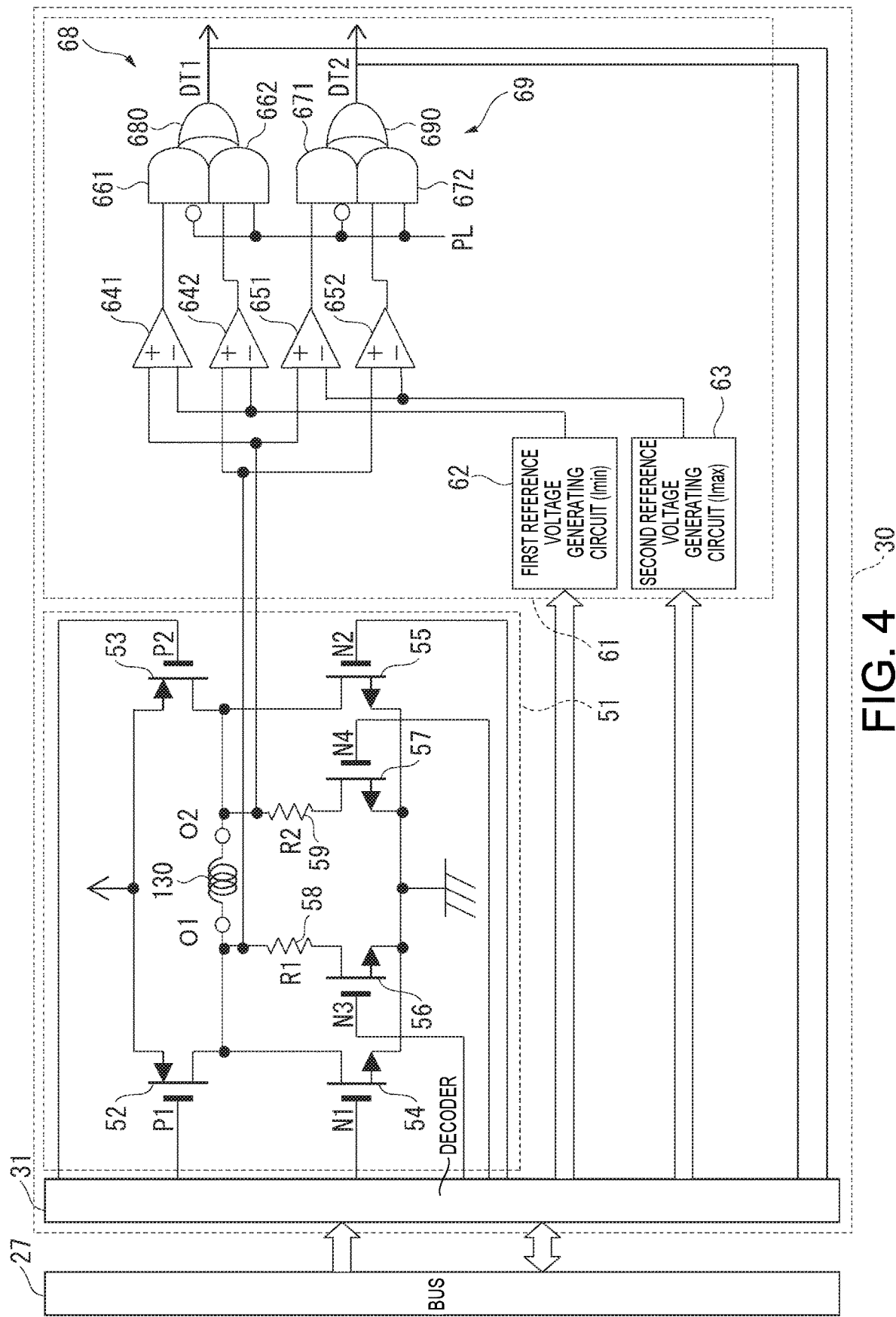
FIG. 4 is a circuit diagram showing the configuration of a motor control circuit of the electronic timepiece according to the first embodiment.

As shown in FIG. 4, the motor control circuit 30 includes a decoder 31, driver 51, and a current detection circuit 61, which is a current detector.

The decoder 31 outputs gate signals P1, P2, N1, N2, N3, N4 to the driver 51 as described below based on commands input from the CPU 23.

The driver 51 includes two p-channel transistors 52, 53, four n-channel transistors 54, 55, 56, 57, and two detection resistors 58, 59. The transistors 52 to 57 are controlled by the gate signals P1, P2, N1, N2, N3, N4 output from the decoder 31, and supply both forward and reverse current to the coil 130 of the motor 13. The driver 51 is therefore a drive means that outputs drive current to the coil 130 of the motor 13 and drives the motor 13.

The current detection circuit 61 includes a first reference voltage generating circuit 62, a second reference voltage generating circuit 63, comparators 641, 642, 651, 652, and complex gates 68, 69.

Complex gate 68 is a single element comprising the same functions as a combination of the AND circuits 661, 662, and OR circuit 680 shown in FIG. 4. Complex gate 69 is a single element comprising the same functions as a combination of the AND circuits 671, 672, and OR circuit 690.

Comparators 641, 642 compare the voltages produced at the ends of the detection resistors 58, 59 of resistances R1, R2, and the voltage of the first reference voltage generating circuit 62.

Because the drive polarity signal PL output from the decoder 31 is inverted and input to AND circuit 661, and the drive polarity signal PL is input without inversion to AND circuit 662, the output of the comparator 641 or 642 selected based on the drive polarity signal PL is output as the output DT1.

The comparators 651 and 652 compare the voltages produced at the ends of the detection resistors 58, 59 of resistances R1, R2, and the voltage of the second reference voltage generating circuit 63.

Because the drive polarity signal PL is input inverted to AND circuit 671, and the drive polarity signal PL is input without inversion to the AND circuit 672, the output of the comparator 651 or 652 selected according to the drive polarity signal PL is output as output DT2.

The first reference voltage generating circuit 62 is configured to output a potential equivalent to the voltage produced at the ends of the detection resistors 58, 59 when the current flow through the coil 130 is minimum current threshold Imin.

Therefore, when the current I flowing through the coil 130 is greater than or equal to minimum current threshold Imin, the voltage produced at the ends of the detection resistors 58, 59 exceeds the output voltage of the first reference voltage generating circuit 62, and the detection signal DT1 goes High. However, when the current I is less than minimum current threshold Imin, the detection signal DT1 goes Low.

As a result, the first reference voltage generating circuit 62, the comparators 641 and 642, and the complex gate 68 of the current detection circuit 61 form a minimum current detector that detects when the current I flowing through the coil 130 is less than minimum current threshold Imin, and the detection signal DT1 is the detection result of the minimum current detector.

The second reference voltage generating circuit 63 produces a voltage equivalent to maximum current threshold Imax. Therefore, the detection signal DT2 of the current detection circuit 61 goes High when the current I flowing through the coil 130 exceeds the maximum current threshold Imax, and is Low when the current I is less than or equal to the maximum current threshold Imax.

As a result, the second reference voltage generating circuit 63, the comparators 651 and 652, and the complex gate 69 of the current detection circuit 61 form a maximum current detector that detects when the current I flowing through the coil 130 exceeds the maximum current threshold Imax, and the detection signal DT2 is the detection result of the maximum current detector.

Control Process of the Motor Control Circuit

Figure 5:
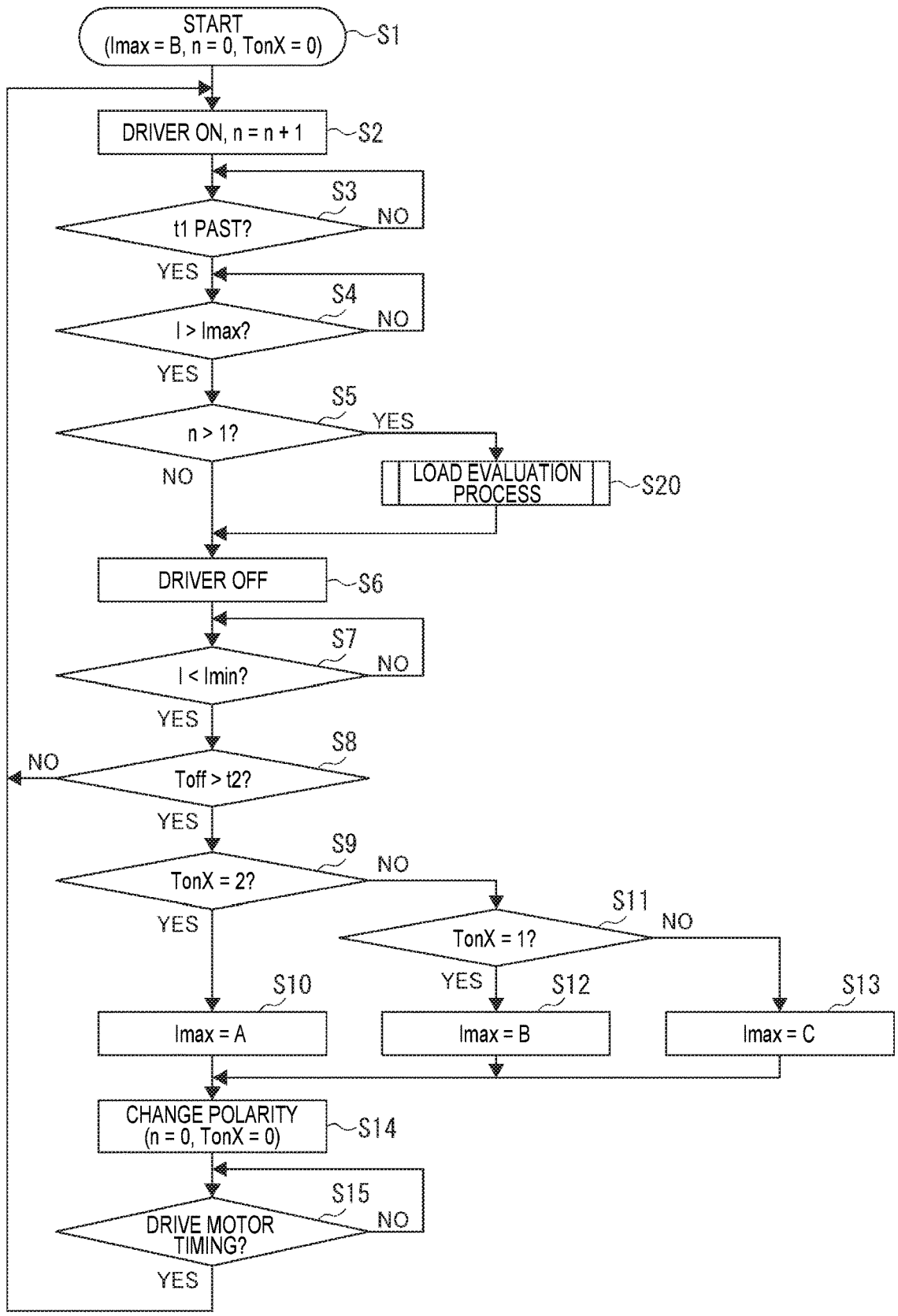
FIG. 5 is a flow chart describing the motor control process in the first embodiment.

Control by the motor control circuit 30 in this embodiment is described next with reference to the flow charts in FIG. 5 and FIG. 6, and the graphs in FIG. 7 and FIG. 8.

Note that the control operation of the motor control circuit 30 described below presumes driving the motor 13 at a frequency of 1 Hz, that is, driving one step every one second.

When the CPU 23 of the IC chip 20 starts driving the motor 13 at a frequency of 1 Hz, that is, driving one step every one second, the CPU 23 first executes the initialization process of step S1 and sets Imax=B, n=0, and TonX=0.

In this example Imax is a variable that indicates to which of three levels, A, B, or C, the level of the maximum current threshold Imax is set; and n is a variable indicating the number of times the driver 51 turned on before the polarity changes after drive control starts. TonX is a variable set to a specific value when the on time Ton, which is the time that the driver 51 is continuously on, exceeds a previously set threshold.

Next, the CPU 23 executes step S2, turns the driver 51 on, and adds 1 to variable n. More specifically, when a command to set the driver 51 on is output from the CPU 23 to the decoder 31, the decoder 31 turns the driver 51 of the motor 13 on by means of gate signals P1, P2, N1, N2, N3, N4. As a result, drive current flows in the forward direction through the coil 130 of the motor 13.

Note that in the flow chart and following description, turning the driver 51 on means controlling the driver 51 to an on state in which drive current can flow to the coil 130, and turning the driver 51 off means controlling the driver 51 to an off state in which drive current cannot flow to the coil 130.

In this embodiment the drive current supplied to the coil 130 changes between a first polarity and a second polarity. When set to the first polarity, current flows in the forward direction through the coil 130, and when set to the second polarity, current flows in the reverse direction, which is the opposite of the forward direction.

In this embodiment, when transistors 52, 57 are controlled to the on state and transistors 53, 54, 55, 56 are controlled to the off state, the current flowing sequentially through transistor 52, terminal O1, coil 30, terminal O2, detection resistor 59, and transistor 57, that is, the current flowing from terminal O1 toward terminal O2 through the coil 130, is the current flow in the forward direction.

When transistors 53, 56 are on, transistors 52, 54, 55, 57 are off, and current flows through transistor 53, terminal O2, coil 130, terminal O1, detection resistor 58, and transistors 56, that is, the current flowing from terminal O2 toward terminal O1 through the coil 130, is the current flow in the reverse direction.

Next, the CPU 23 executes step S3, and determines whether or not a specific time t1 has past since the driver 51 turned on.

This specific time t1 is set to the minimum on time Ton of the driver 51, and the on time Ton of the driver 51 is controlled to always be greater than specific time t1.

Of NO is determined in step S3, the CPU 23 repeats the process of step S3.

If step S3 returns YES, the CPU 23 executes the process of step S4 to determine whether or not the current I flow through the coil 130 exceeds the maximum current threshold Imax. As described above, the current detection circuit 61 outputs the detection signal DT2 as a high level signal when the voltage produced by the detection resistors 58, 59 exceeds the reference voltage of the second reference voltage generating circuit 63. As a result, the CPU 23 detects the detection signal DT2 through the decoder 31, returns NO in step S4 if the detection signal DT2 is low, and returns YES in step S4 if the detection signal DT2 is high.

When the CPU 23 determines YES in step S4, the CPU 23 executes step S5 to determine whether or not n>1. When the CPU 23 determines NO in step S5, that is, when n=1 and the number of times the driver 51 turned on is 1, the CPU 23 executes step S6 of turning the driver 51 off through the decoder 31.

However, when the CPU 23 determines YES in step S5, that is, when n is greater than or equal to 2, the CPU 23 executes the load evaluation process in S20 every time the driver 51 turns on. That the load evaluation process of S20 is limited to when n is greater than or equal to 2 is because time is required for the current I to reach the maximum current threshold Imax the first time the driver 51 is turned on after drive control of the motor 13 starts or the polarity changes, and the on time Ton cannot be used for load evaluation during this time.

Figure 6:
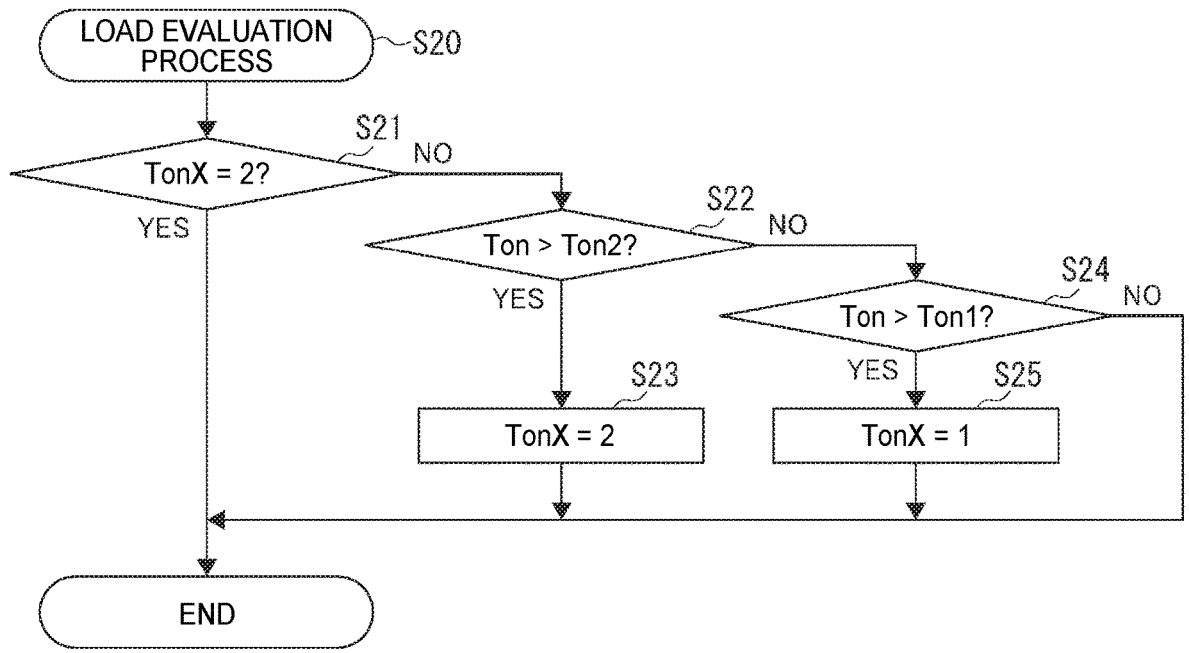
FIG. 6 is a flow chart describing the load evaluation process in the first embodiment.

When executing the load evaluation process S20, the CPU 23 executes step S21 to determine whether or not the variable TonX equals 2 as shown in FIG. 6. If the CPU 23 determines YES in step S21, the CPU 23 ends the load evaluation process S20 while keeping the variable TonX set to 2.

However, if the CPU 23 determines NO in step S21, the CPU 23 executes step S22 to compare the on time Ton of the driver 51 with the threshold value Ton2. If the CPU 23 determines YES in step S22, the CPU 23 executes step S23 to set the variable TonX to 2, and then ends the load evaluation process S20.

If the CPU 23 determines NO in step S22, the CPU 23 executes step S24 to compare the on time Ton of the driver 51 with threshold value Ton1. Threshold value Ton1 is a time shorter than threshold value Ton2. If the CPU 23 determines YES in step S24, the CPU 23 executes step S25 to set the variable TonX to 1, and then ends the load evaluation process S20.

If the CPU 23 determines NO in step S24, the CPU 23 ends the load evaluation process S20 without changing the value of variable TonX. Note that as described below, the variable TonX is initialized to 0 when the polarity changes.

As a result, in the load evaluation process S20, the variable TonX remains set to 0 during the period until the polarity changes unless the on time Ton exceeds the threshold value Ton1 at least once, and if the on time Ton exceeds the threshold value Ton1 at least once but does not exceed threshold value Ton2 even once, the variable TonX remains set to 1. However, if the on time Ton exceeds the threshold value Ton2 at least once during the period until the polarity changes, variable TonX is kept set to 2.

When the CPU 23 ends the evaluation process of load evaluation process S20, and when NO is determined in step S5, the CPU 23 executes step S6 and turns the driver 51 off.

When the CPU 23 executes step S6, the CPU 23 outputs to the decoder 31 a command to turn the driver 51 off, and the decoder 31 turns the driver 51 off by means of gate signals P1, P2, N1, N2, N3, N4. More specifically, P1 goes High, P2 goes High, N1 goes High, N2 goes Low, N3 goes High, and N4 goes High. As a result, the ends of the coil 130 are connected to the power supply terminal VSS and shorted, and the supply of current I from the driver 51 to the coil 130 stops. Therefore, the state in which current is not flowing through the coil 130 is a state in which the driver 51 is controlled to the off state. In this embodiment, the state in which p-channel transistors 52, 53 and n-channel transistor 55 are off, and n-channel transistors 54, 56, 57 are on, is the off state of the first polarity of the driver 51.

Next, the CPU 23 executes step S7 to determine whether or not the current I flowing through the coil 130 went below the minimum current threshold Imin.

As described above, the detection signal DT1 of the current detection circuit 61 is output as a Low level signal when the voltage output by the detection resistors 58, 59 is below the reference voltage of the first reference voltage generating circuit 62. As a result, the CPU 23 detects the detection signal DT1 through the decoder 31, determines NO in step S7 if the detection signal DT1 goes High and then repeats the evaluation process of step S7, and if the detection signal DT1 changes to Low, the CPU 23 returns YES in step S7.

When the CPU 23 determines YES in step S7, the CPU 23 executes step S8 to determine whether or not the off time Toff, which is the time the driver 51 remains continuously off, exceeds evaluation time t2, which is a condition for changing polarity. More specifically, the CPU 23 determines NO in step S8 if the off time Toff, which is the time until the current I goes below the minimum current threshold Imin, is less than or equal to evaluation time t2 after the driver 51 is turned off, and determines YES in step S8 if the off time Toff exceeds the evaluation time t2.

If the CPU 23 determines NO in step S8, the condition for changing the polarity is not met. The CPU 23 therefore returns to step S2 without changing the polarity, turns the driver 51 on and drives the motor 13, and adds 1 to variable n.

If the CPU 23 determines YES in step S8, the CPU 23 sets the value of the maximum current threshold Imax according to the value of variable TonX.

The value of the maximum current threshold Imax can be set in three levels, A, B, and C, and in this embodiment A is lowest, C is greatest, and B is between levels A and C. In other words, A<B<C.

When the load increases, such as when the weight of the second hand 5, minute hand 6, and hour hand 7 that are driven by the motor 13 is great, or when the ambient temperature of the motor 13 is low, the change in magnetic flux becomes gradual near the neutral point where the pull-in torque of the stator is lowest, for example approximately 60 degrees, and the back electromotive force decreases, and current therefore flows more easily in the direction in which voltage is applied. As a result, the on time Ton, which is the time until the specific maximum current threshold Imax is reached, becomes shorter. FIG. 7 is a graph correlating the current waveform when the load is high to the rotational angle of the rotor.

However, because the change in magnetic flux becomes more abrupt when the load decreases, the back EMF increases, and the flow of current in the direction in which voltage is applied becomes more difficult. As a result, the on time Ton increases. FIG. 8 is a graph correlating the current waveform to the rotational angle of the rotor when the load is less than in the state shown in FIG. 7.

Figure 7:
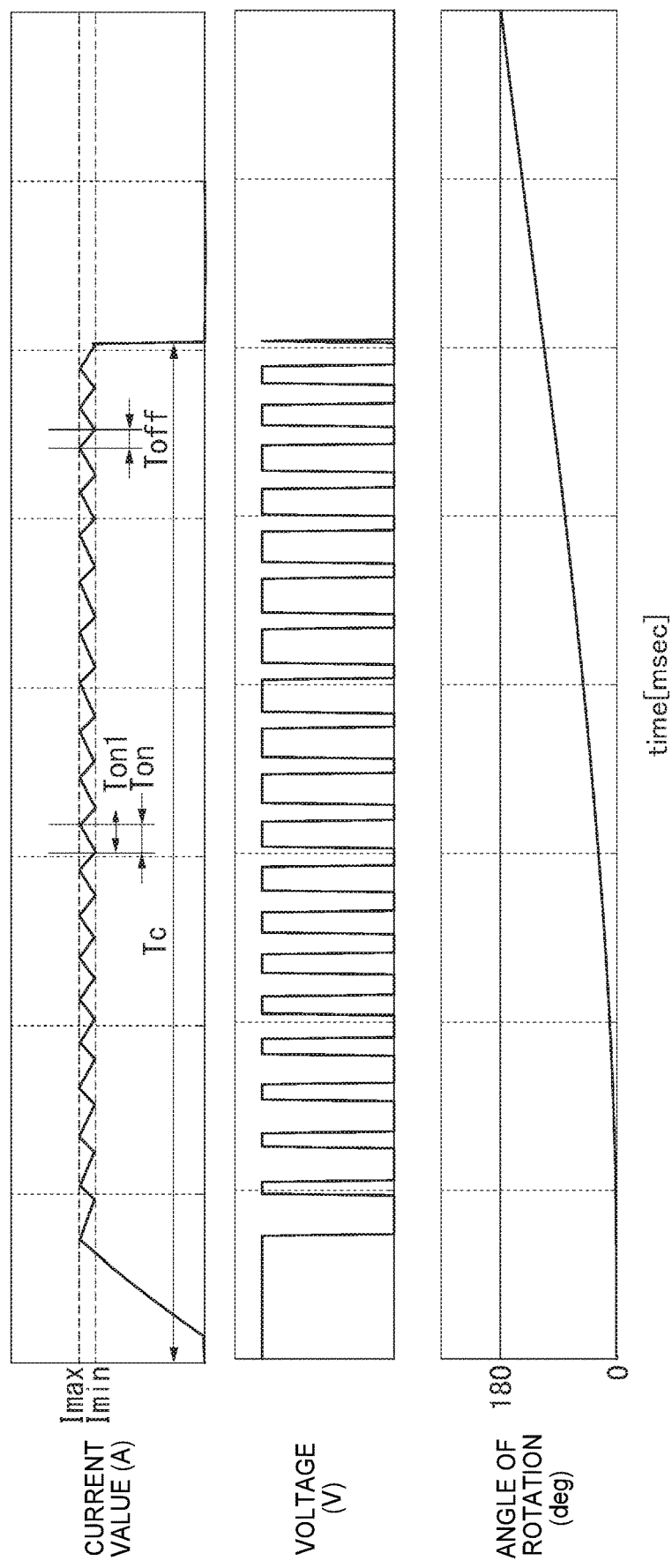
FIG. 7 is a graph of change in the current, voltage, and angle of rotation when the load is high in the first embodiment.

As shown in FIG. 7, when the load is high, the number of times the driver 51 turns on until the polarity changes increases, but each on time is relatively short. When variable n is greater than or equal to 2, and the on time Ton does not exceed the threshold value Ton1 even once, that is, when the maximum on time Ton is less than threshold value Ton1, the variable TonX is held to 0.

Figure 8:
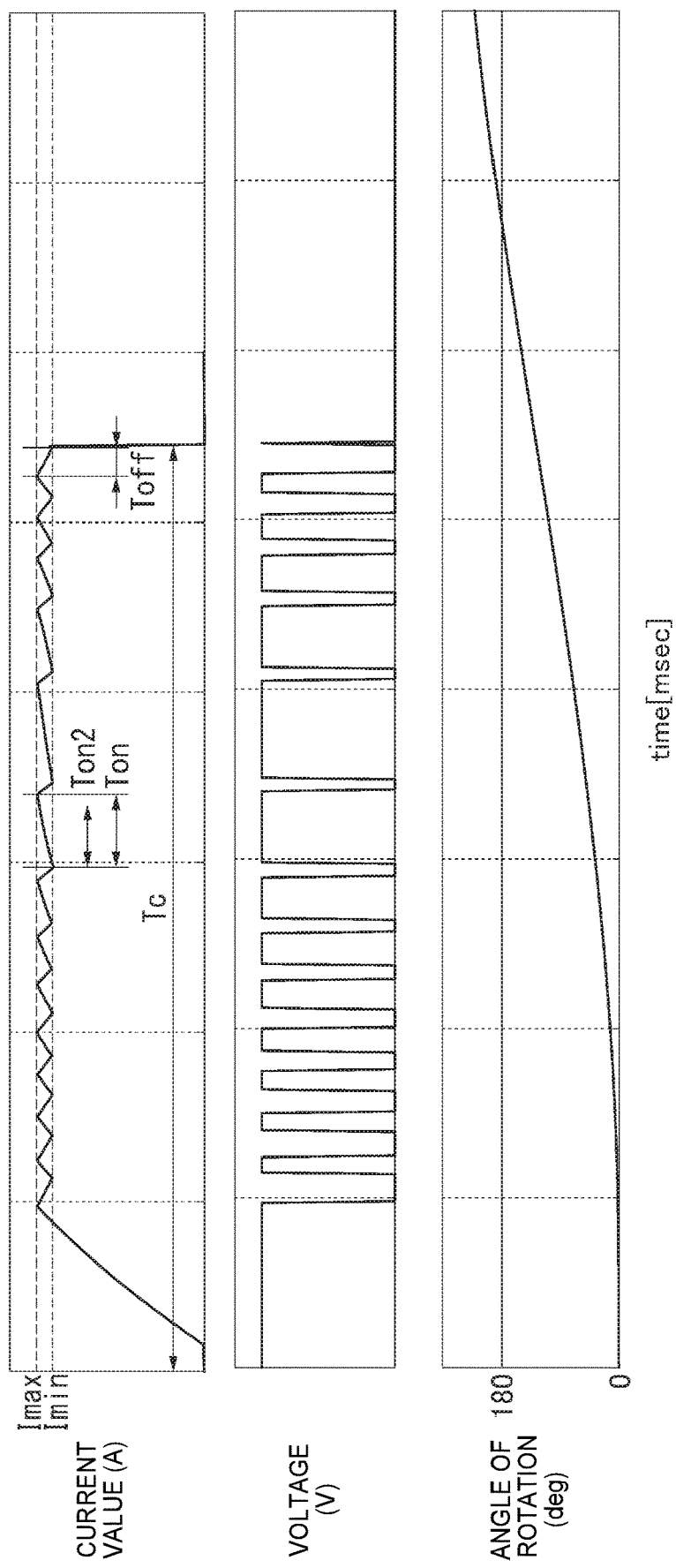
FIG. 8 is a graph of change in the current, voltage, and angle of rotation when the load is low in the first embodiment.

As shown in FIG. 8, however, when the load is small, the number of times the driver 51 turns on before the polarity changes decreases, but the on time may increase, and variable TonX is set to 2 because the on time Ton may exceed the threshold value Ton2 when variable n is greater than or equal to 2.

Note that while not shown in the figures, when the load is neither high nor low and the on time Ton is held between threshold value Ton1 and threshold value Ton2, variable TonX is set to 1.

The CPU 23 therefore executes step S9 to determine whether or not variable TonX equals 2, determines the load is small if YES is determined in step S9, and then executes step S10 to set the value of the maximum current threshold Imax to the lowest level A. More specifically, the CPU 23 sets the maximum current threshold Imax of the second reference voltage generating circuit 63 through the decoder 31.

If NO is determined in step S9, the CPU 23 executes step S11 to determine whether or not variable TonX equals 1, determines the load is moderate if YES is determined in step S11, and therefore executes step S12 to set the maximum current threshold Imax of the second reference voltage generating circuit 63 to level B.

However, if the CPU 23 determines NO in step S11, the CPU 23 determines the load is high because the variable TonX equals 0, and executes step S13 to set the maximum current threshold Imax of the second reference voltage generating circuit 63 to the highest level C.

After setting the value of the maximum current threshold Imax in step S10, S12, or S13, the CPU 23 changes the polarity and initializes variable n and variable TonX to 0 in step S14.

The CPU 23 then executes step S15 to determine whether or not the next motor drive timing was reached. If the CPU 23 determines NO in step S15, the CPU 23 repeats the evaluation process of step S15, and returns to step S2 if step S15 returns YES. For example, if the motor 13 is driven every second, and the second hand 5, minute hand 6, and hour hand 7 are moved a step every second, the CPU 23 determines NO in step S15 until one second passes after the driver 51 turns on in the previous iteration of step S2. If one second has past, the CPU 23 determines YES in step S15, returns to step S2, and executes the step movement, that is, repeats the process.

Because the polarity has changed in this iteration of step S2, the CPU 23 controls the decoder 31 to output gate signals set so that the current flows through the coil 130 in the opposite direction as the previous step. More specifically, P1 goes High, P2 goes Low, N1, N2, and N4 go Low, and N3 goes High. As a result, p-channel transistor 52 turns off, and p-channel transistor 53 turns on.

In addition, n-channel transistors 54, 55, 57 are on and n-channel transistor 56 is on. As a result, current flows through p-channel transistor 53, terminal O2, coil 130, terminal O1, detection resistor 58, and n-channel transistor 56. The drive current output to the coil 130 is therefore the second polarity, and current flows to the coil 130 in the reverse direction, which is opposite the forward direction. The state in which current flows in the reverse direction to the coil 130 is therefore the state in which the driver 51 is on to output a drive signal of the second polarity.

The CPU 23 therefore repeats the process of step S2 to S15 and the load evaluation process S20 while alternately switching between the first polarity and the second polarity.

As described above, the CPU 23 of the electronic timepiece 1 functions as a driver controller that controls a driver 51, and a control parameter setter that sets the control parameters controlling the driver 51.

Effect of Embodiment 1

The CPU 23, which is the driver controller, can detect the control state controlling the driver 51 to the on state or the off state, or more specifically detects the load of the motor 13 based on the on time Ton. As a result, the maximum current threshold Imax, which is a control parameter of the driver 51, can be adjusted, or more specifically the maximum current threshold Imax can be maintained or changed, according to the load on the motor 13, and the motor can be driven under appropriate drive conditions reflecting variation in the load on the motor 13. As a result, the motor 13 can be driven with low power consumption when the motor 13 load is low, can be driven with high power consumption when the load is high, and the motor 13 can be reliably driven with low power consumption.

While holding the drive current of the motor 13 in a specific range between the maximum current threshold Imax and the minimum current threshold Imin and controlling driving the motor, the CPU 23 detects the load on the motor 13 based on the on time Ton, and changes the maximum current threshold Imax according to the load. As a result, the motor 13 can be driven reliably because the maximum current threshold Imax can be changed according to the load even when the motor 13 load changes.

Furthermore, because the maximum current threshold Imax changes in three levels according to the load, the value of the maximum current threshold Imax can be lowered and power consumption can be reduced when the load is low. In other words, by setting the maximum current threshold Imax according to the load, the motor 13 can be driven reliably with low power consumption.

Furthermore, the on time Ton can be easily measured because the CPU 23 can simply measure the time that the driver 51 is controlled to the on state. Therefore, the CPU 23 can easily detect change in the motor 13 load and can easily control the control parameters.

Variation in the load can also be accurately detected because until YES is determined in step S8, that is, during the elapsed time Tc until the polarity changes, the load evaluation process S20 can be executed each time the driver 51 turns on.

Because the CPU 23 controls the driver 51 through the bus 27 and decoder 31 in this embodiment, the number of circuit elements can be reduced compared with controlling the driver 51 by a logic circuit.

Embodiment 2

An electronic timepiece 1A according to the second embodiment of the present disclosure is described below with reference to FIG. 9 to FIG. 14. Note that members and elements with the same function as in the first embodiment are identified by like reference numerals, and further description thereof is omitted.

Figure 9:
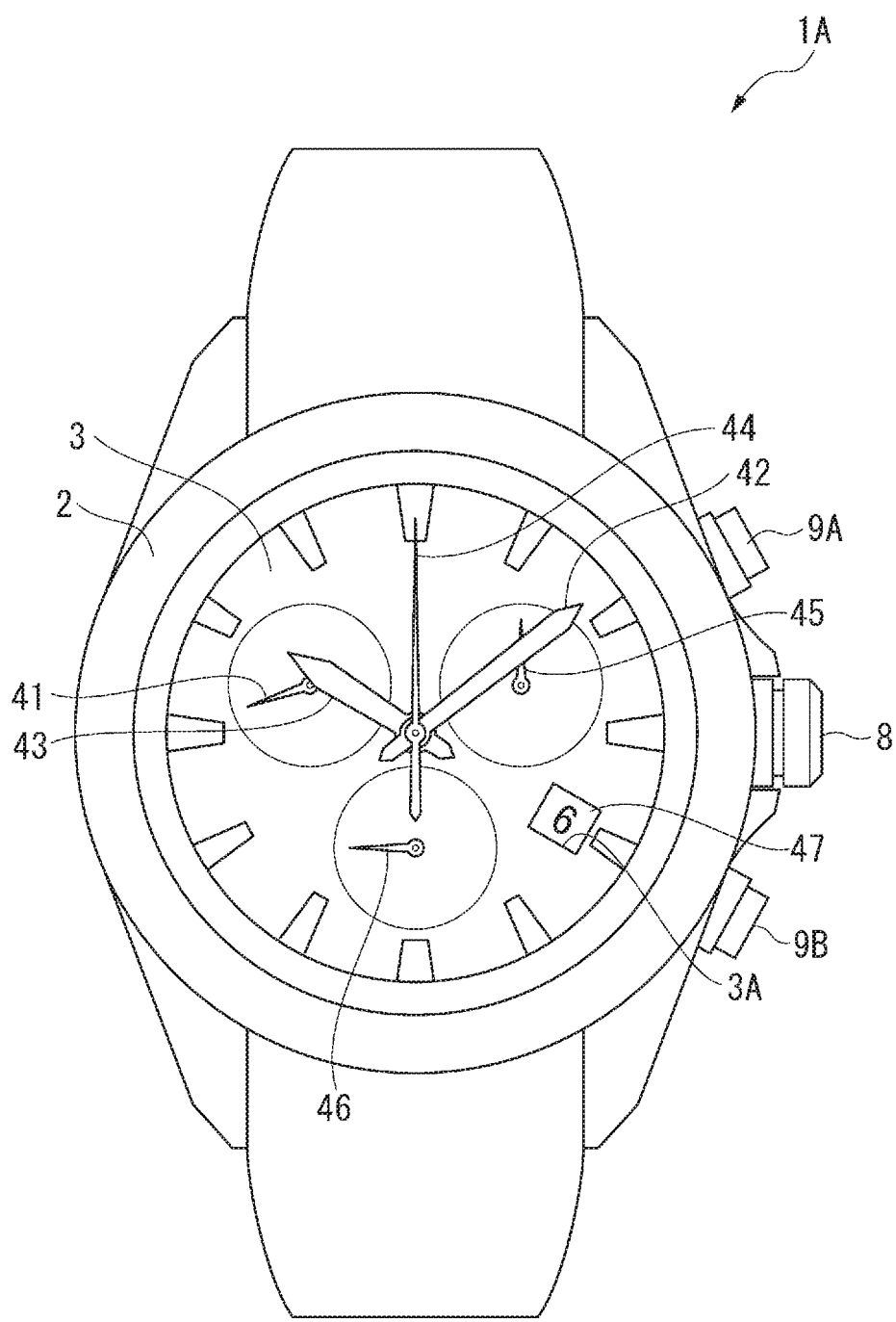
FIG. 9 is a front view of an electronic timepiece according to a second embodiment.

The electronic timepiece 1A according to the second embodiment is an electronic timepiece with a chronograph function, and as shown in FIG. 9 has an external case 2, a dial 3, a crown 8 and buttons 9A and 9B. The electronic timepiece 1A has three pivots disposed coaxially in the plane center of the dial 3, and attached to these pivots are a minute hand 42, hour hand 43, and a ⅕ second chronograph hand 44.

Offset toward 10:00 from the plane center of the dial 3 is a pivot to which is attached a small second hand 41. Offset toward 2:00 from the plane center of the dial 3 is a pivot to which is attached a chronograph minutes hand 45. Offset toward 6:00 from the plane center of the dial 3 is a pivot to which is attached a chronograph hour hand 46 that also functions as a mode indicator. A date window 3A is also formed in the dial 3, and a date wheel 47 can be seen through the date window 3A.

Figure 10:
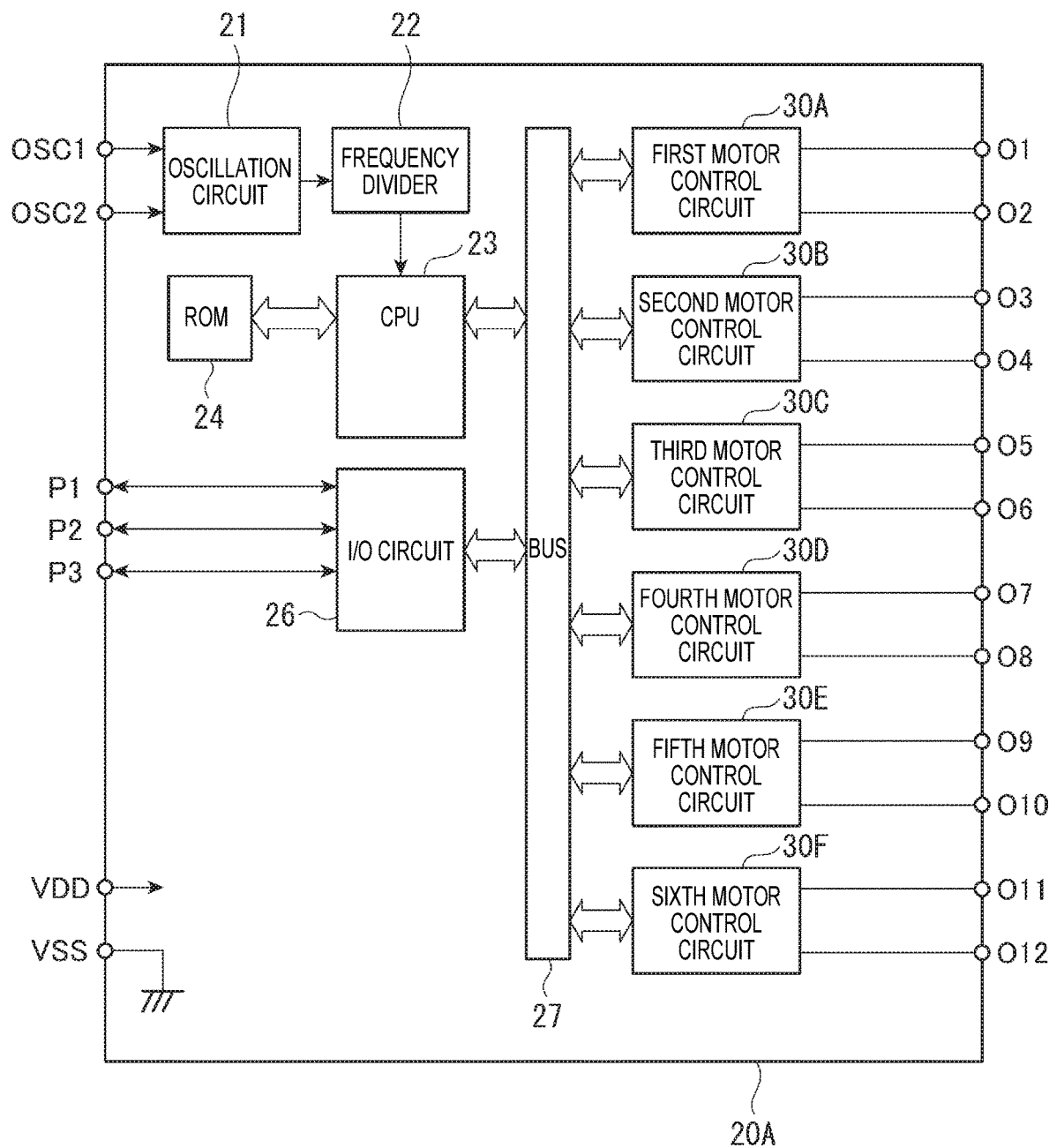
FIG. 10 illustrates the configuration of an IC chip in the electronic timepiece according to the second embodiment.

As shown in FIG. 10, the electronic timepiece 1A has an IC chip 20A similar to the IC chip 20 of the first embodiment, and a first motor control circuit 30A to sixth motor control circuit 30F.

The first motor control circuit 30A controls driving a motor not shown that drives the small second hand 41. The second motor control circuit 30B controls driving a motor not shown that drives the minute hand 42 and hour hand 43. The third motor control circuit 30C controls driving a motor not shown that drives the ⅕ second chronograph hand 44. The fourth motor control circuit 30D controls driving a motor not shown that drives the chronograph minutes hand 45. The fifth motor control circuit 30E controls driving a motor not shown that drives the chronograph hour hand 46. The sixth motor control circuit 30F controls driving a motor not shown that drives the date wheel 47.

The IC chip 20A has an input/output terminal P1 connected to a switch S1 that detects input from the button 9A, an input/output terminal P2 connected to a switch S2 that detects input from the button 9B, and an input/output terminal P3 connected to a switch S3 that detects operation of the crown 8.

The drive control method of the ⅕ second chronograph hand 44 of the electronic timepiece 1A is described below with reference to the flow charts in FIG. 11 to FIG. 14. The ⅕ second chronograph hand 44 is controlled by the CPU 23 and third motor control circuit 30C of the IC chip 20A as in the first embodiment.

Figure 11:
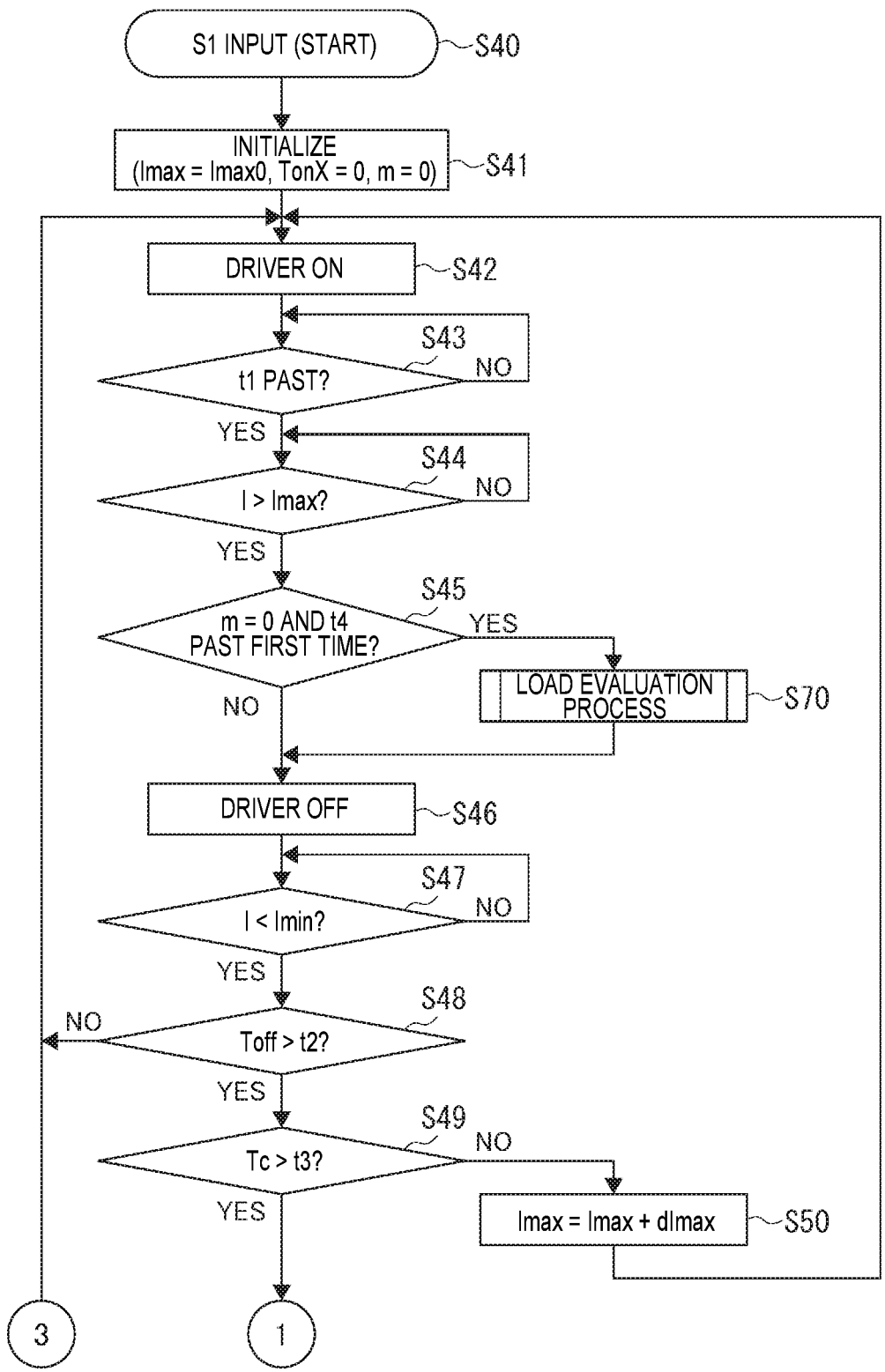
FIG. 11 is a flowchart describing the motor control process in the second embodiment.

When a start signal, which is a signal to start motor drive by the chronograph function start operation of the button 9A, is input, the CPU 23 starts the process of step S40 in FIG. 11. The CPU 23 then executes step S41 to set the maximum current threshold Imax to initial value Imax0, and set variable TonX and variable m to 0.

The initial value Imax0 is a value previously set by tests, for example. The variable TonX is the same as in the first embodiment. Variable m is a control flag indicating whether or not to execute the load evaluation process S70 and Imax setting process S80 described below.

Next, the CPU 23 executes the process of steps S42 to S44, which is the same as the process of steps S2 to S4 in the first embodiment. If the CPU 23 determines YES in step S44, the CPU 23 executes the evaluation process of step S45 to determine whether or not variable m is set to 0 and the time past since the driver 51 turned on in step S42 has exceeded a previously set threshold value t4 for the first time.

After variable m is initialized in step S41 to 0, variable m is set to 1 when the Imax setting process S80 executes as described below, and is reset to 0 every one minute after the chronograph function starts. As a result, step S45 returns YES every minute the first time threshold value t4 is exceeded after the driver 51 turns on in step S42.

This threshold value t4 is provided so that the on time Ton is not evaluated the first time the driver 51 turns on after the polarity changes, and can be previously determined by tests. In this embodiment, the threshold value t4 is set to 0.5 ms to 1 ms, for example.

The CPU 23 executes the load evaluation process S70 when YES is determined in step S45.

Figure 12:
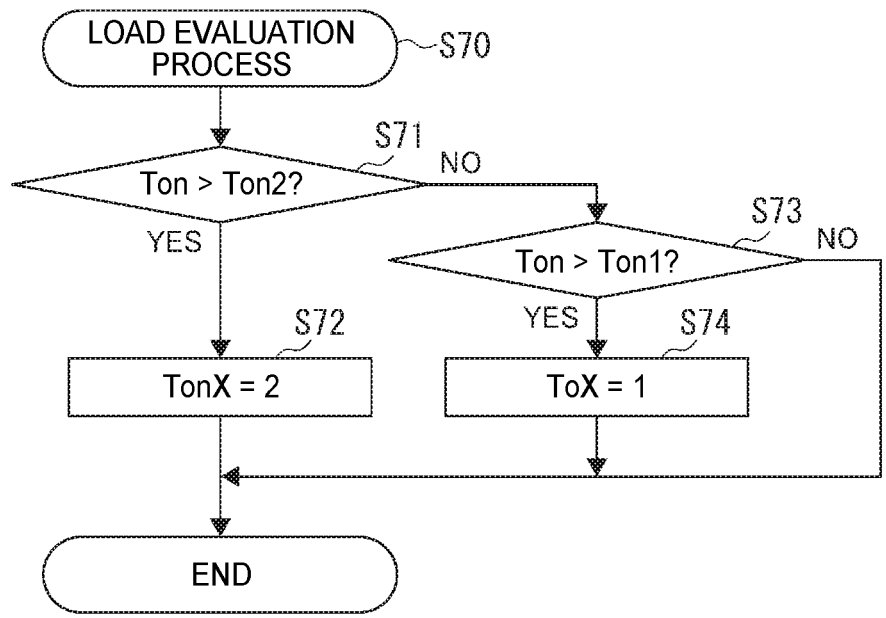
FIG. 12 is a flow chart describing the load evaluation process in the second embodiment.

As shown in FIG. 12, when the CPU 23 executes the load evaluation process S70, the CPU 23 first determines whether or not the on time Ton of the driver 51 is longer than the threshold value Ton2.

If the CPU 23 determines YES in step S71, the CPU 23 executes step S72 to set variable TonX to 2, and then ends the load evaluation process S70.

If the CPU 23 determines NO in step S71, the CPU 23 executes step S73 to determine whether or not the on time Ton is longer than threshold value Ton1. If the CPU 23 determines YES in step S73, the CPU 23 executes step S74 to set variable TonX to 1, and then ends the load evaluation process S70.

If the CPU 23 determines NO in step S73, the CPU 23 ends the load evaluation process S70 while leaving the variable TonX set to the initial value 0.

When the CPU 23 determines NO in step S45, and when the load evaluation process S70 ends, the CPU 23 executes the process of steps S46 to S48, which is the same as steps S6 to S8 in the first embodiment.

When the CPU 23 determines NO in step S48, the CPU 23 returns to step S42 and repeats the process from step S42 to S48. If the load evaluation process S70 was already executed in this event, the CPU 23 determines NO in step S45 even if the elapsed time exceeds the threshold value t4 because it is not the first time the threshold value t4 was exceeded. More specifically, the load evaluation process S70 executes once every minute as described below.

When the CPU 23 determines YES in step S48, the CPU 23 executes step S49 to determine whether or not the elapsed time Tc, which is the time between the start of supplying drive current and when the off time Toff exceeds evaluation time t2, exceeds a previously set threshold value t3, which is the condition for changing polarity. Note that the start of supplying drive current is the first time step S42 executes after step S41 or after the polarity is changed in step S51.

Threshold value t3 is set to prevent erroneous results when evaluating rotor rotation, and when the elapsed time Tc is shorter than the threshold value t3, that is, when the elapsed time Tc is extremely short, the likelihood that the motor is not operating is high.

As a result, when the CPU 23 determines NO in step S49, the CPU 23 executes step S50 to set a new maximum current threshold Imax by adding a specific value dImax to the maximum current threshold Imax. The specific value dImax is approximately 10% to 20% of the maximum current threshold Imax. If the maximum current threshold Imax increases, the amount of electrical energy supplied to the coil of the motor increases, and the ability to drive the motor increases.

After executing step S50, the CPU 23 returns to step S42 and the process repeats from on control of the driver.

When the CPU 23 determines YES in step S49, the CPU 23 executes step S51 to change the polarity. The CPU 23 then executes step S52 to determine if m=0, and executes the Imax setting process S80 if step S52 returns YES.

Figure 14:
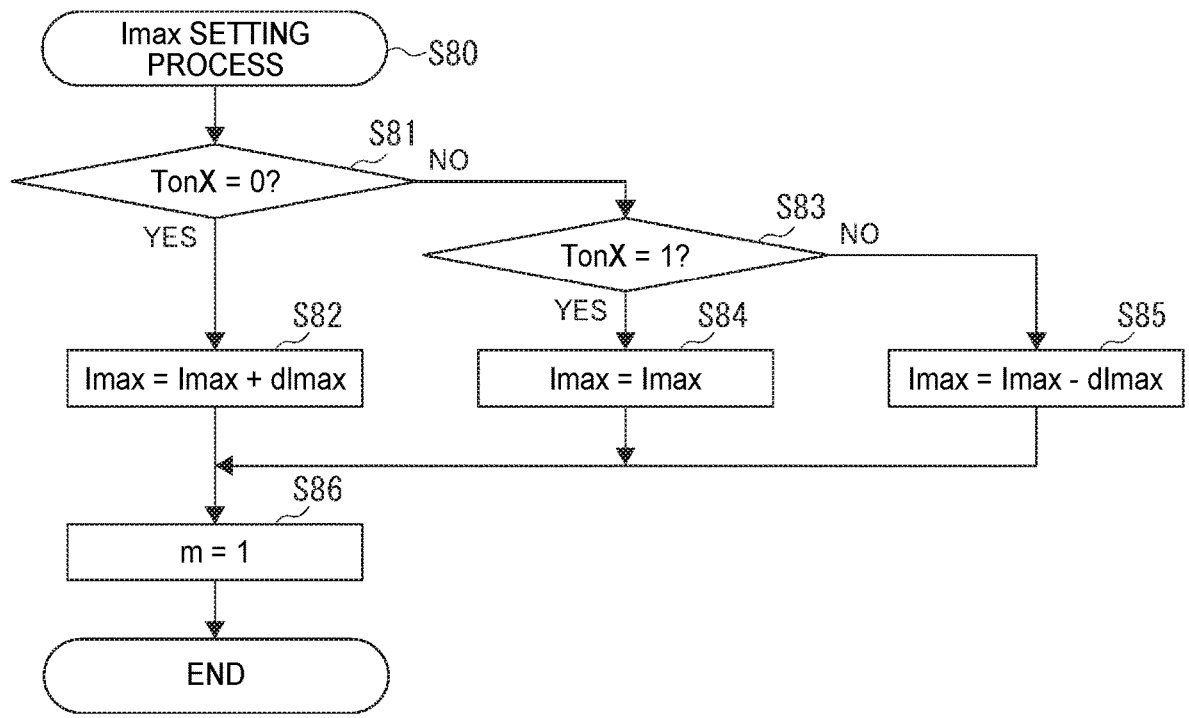
FIG. 14 is a flow chart describing the maximum current threshold Imax setting process in the second embodiment.

In the Imax setting process S80, as shown in FIG. 14, the CPU 23 executes step S81 to determine if variable TonX=0. If the CPU 23 determines YES in step S81, the CPU 23 determines that the load of the hands, for example, driven by the motor is high, and executes step S82 to add the specific value dImax to the maximum current threshold Imax and increase the maximum current threshold Imax.

If the CPU 23 determines NO in step S81, the CPU 23 executes step S83 to determine whether or not variable TonX=1.

If the CPU 23 determines YES in step S83, the CPU 23 determines the motor load is moderate, and executes step S84 to keep the maximum current threshold Imax set to the current value.

If the CPU 23 determines NO in step S83, that is, if variable TonX=2, the CPU 23 determines the motor load is low, and executes step S85 to subtract specific value dImax from the maximum current threshold Imax and lower the maximum current threshold Imax.

After executing step S82, S84, or S85, the CPU 23 executes step S86 to set variable m to 1. The variable m is therefore set to 1 when the maximum current threshold Imax is set, reset to 0 after one minute, and used as a flag to determine whether or not to execute the load evaluation process S70 and the Imax setting process S80.

Figure 13:
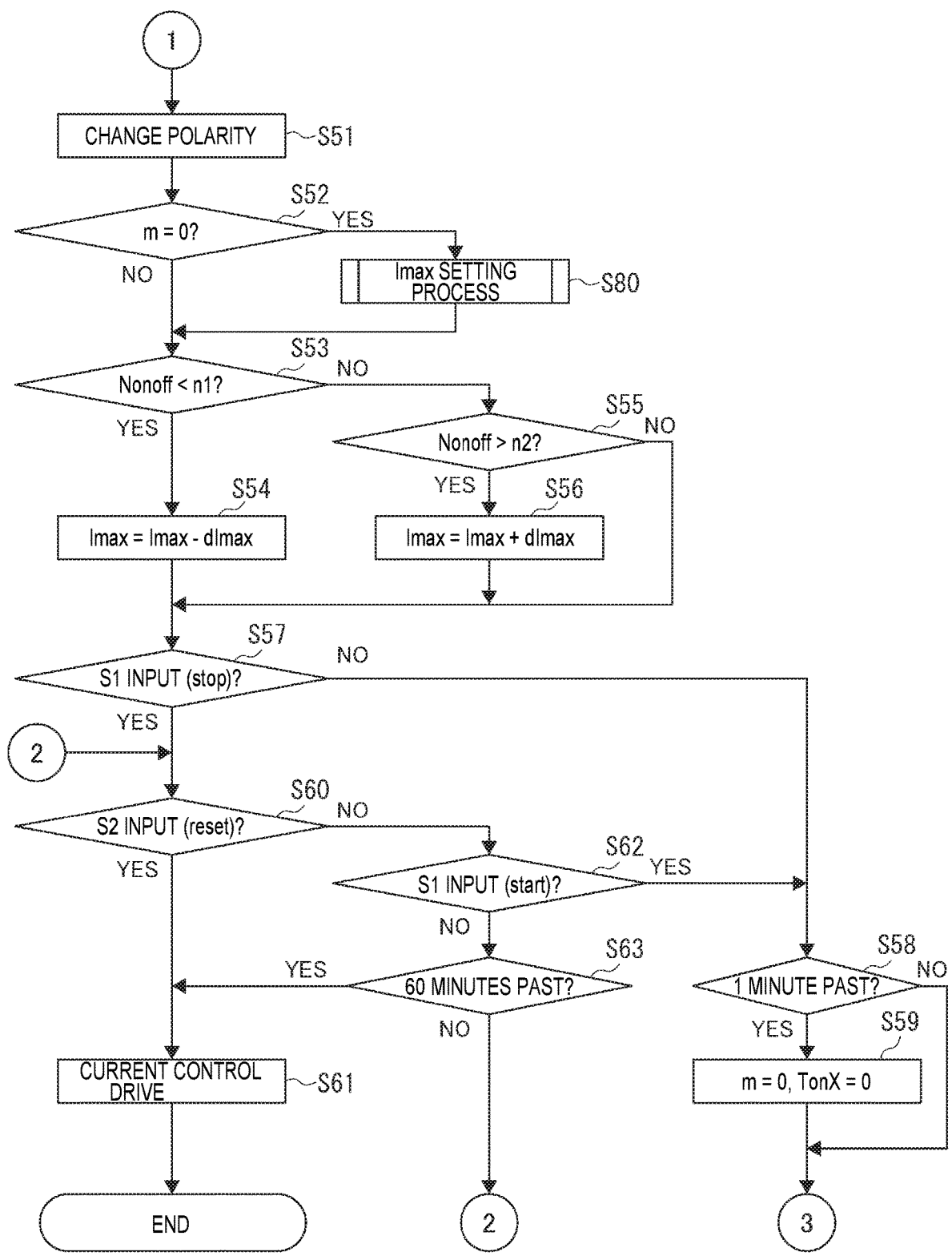
FIG. 13 is a flowchart describing the motor control process in the second embodiment.

After executing step S86, the CPU 23 ends the Imax setting process S80 and returns to the process of the flow chart shown in FIG. 13.

When the CPU 23 determines NO in step S52, and when the Imax setting process S80 ends, the CPU 23 determines if the maximum current threshold Imax is appropriate based on count Nonoff, which is the number of on states and off states of the driver 51, and executes a process to adjust the maximum current threshold Imax.

More specifically, the CPU 23 executes step S53 to determine whether or not the count Nonoff, which is the sum of the count Non of driver 51 on states and the count Noff of driver 51 off states, during the time until the time until YES is returned in step S48, that is, during the elapsed time Tc, is less than a first count n1.

If the CPU 23 determines YES in step S53, the maximum current threshold Imax is high relative to the motor load and the accuracy of detecting the rotational position of the rotor decreases. As a result, the CPU 23 executes step S54 to subtract the specific value dImax from the maximum current threshold Imax and lower the maximum current threshold Imax.

If the CPU 23 determines NO in step S53, the CPU 23 executes step S55 to determine whether or not the count Nonoff is greater than a second count n2. Note that second count n2 is set greater than or equal to first count n1. The specific values of the first count n1 and second count n2 can be previously set by tests.

If the CPU 23 determines YES in step S55, the maximum current threshold Imax is low relative to the motor load, the number of on states and off states of the driver 51 increases, and the drive speed decreases. As a result, the CPU 23 executes step S56 to add the specific value dImax to the maximum current threshold Imax and increase the maximum current threshold Imax.

If the CPU 23 determines NO in step S55, that is, if the count Nonoff is greater than or equal to first count n1 and is less than or equal to second count n2, the maximum current threshold Imax is determined to be appropriate and remains unchanged.

Next, the CPU 23 executes step S57 to determine whether or not the button 9A was pressed again and a stop signal to stop the chronograph was input.

If the CPU 23 determines NO in step S57, that is, a stop signal was not input, the CPU 23 initializes the previous variable m to 0, and then executes step S58 whether or not one minute has past since initialization.

If the CPU 23 determines YES in step S58, the CPU 23 executes step S59 to initialize variable m and variable TonX. If the CPU 23 determines NO in step S58, the CPU 23 does not initialize variable m and variable TonX and the values remain unchanged.

Therefore, in this embodiment as described above, the load evaluation process S70 and Imax setting process S80 are executed once a minute, and even if the load varies while chronograph operation continues, the load is evaluated once a minute, and the maximum current threshold Imax can be adjusted according to the load. In addition, the CPU 23 controls driving the motor one step each time the polarity changes, but the load evaluation process S70 is executed when driving the motor the first step, and the maximum current threshold Imax, which is a control parameter for the second and following steps, is set by the Imax setting process S80 according to the on time Ton in control of the first step. Thereafter, the load evaluation process S70 executes at a one-minute interval, which is an example of a specific interval, and in each step after the step in which the load evaluation process S70 is executed, the motor is controlled based on the maximum current threshold Imax set by the Imax setting process S80.

After the initialization process of step S59 is executed, and when NO is determined in step S58, the CPU 23 returns to step S42 in FIG. 11, and continues the motor drive process.

When a stop signal is input and the CPU 23 determines YES in step S57, the CPU 23 executes step S60 to determine whether or not button 9B was operated to execute the reset operation and there is input from the switch S2 as shown in FIG. 13.

If the CPU 23 returns YES in step S60, the CPU 23 executes step S61 to execute current control drive to reset the hand to the 0 position. More specifically, because the CPU 23 knows the positions at which the ⅕ second chronograph hand 44, chronograph minutes hand 45, and chronograph hour hand 46 were stopped by the stop signal, that is, knows the measured time, the CPU 23 can also know the number of steps required to reset the hands 44 to 46 to the 0 positions. The current can therefore be controlled to drive the hands only the number of steps required to return to zero. Note that because the chronograph hour hand 46 also functions as a mode indicator, the chronograph hour hand 46 may be returned to the appropriate mode position instead of to zero.

If the CPU 23 determines NO in step S60, the CPU 23 executes step S62 to determine whether or not the button 9A was operated to start operation and a start signal was input.

If the CPU 23 determines YES in step S62, the CPU 23 executes the evaluation process of step S58 as described above, and if YES is determined in step S58, executes the initialization process of step S59, returns to step S42 in FIG. 11, and resumes driving the motor.

If the CPU 23 determines NO in step S62, the CPU 23 executes step S63 to determine whether or not 60 minutes have past since chronograph operation started. YES is returned in step S63 when 60 minutes have past without the user executing the stop operation. Because the likelihood that the user forgot to execute the reset operation is high in this event, the CPU 23 executes step S61 to execute current control drive to zero the hands.

If the CPU 23 determines NO in step S63, the CPU 23 returns to the process of step S60, and continues the processes described above.

The CPU 23 in this electronic timepiece 1A therefore also functions as a driver controller that controls a driver 51, and a control parameter setter that sets the control parameters controlling the driver 51.

Effect of Embodiment 2

As in the first embodiment, the second embodiment detects the load on the motor 13 based on the on time Ton and changes the maximum current threshold Imax according to the load while controlling driving by holding the drive current of the motor 13 in a specific range between a maximum current threshold Imax and a minimum current threshold Imin. As a result, the motor 13 can be driven reliably because the maximum current threshold Imax can be changed according to the load even when the motor 13 load changes.

In addition, because the load evaluation process S70 is executed only once each minute, and the current is controlled for one minute based on the maximum current threshold Imax set by the Imax setting process S80 based on the result from the load evaluation process S70, even a motor that drives at a high speed, such as the motor that drives the ⅕ second chronograph hand 44, can be controlled.

Because the Imax setting process S80 increases or decreases the maximum current threshold Imax by a specific value dImax instead of setting the maximum current threshold Imax to a fixed value A, B, or C as in the first embodiment, the specific value dImax is repeatedly added or subtracted when the load is determined to be low or high in the load evaluation process S70 that is executed once a minute, and the maximum current threshold Imax can be appropriately adjusted according to the load on the motor. The motor can therefore be driven more reliably.

Because the maximum current threshold Imax is set by the Imax setting process S80 that executes at a one minute interval, but the process of adjusting the maximum current threshold Imax by comparing count Nonoff with a first count n1 and a second count n2 executes each time the polarity changes, the maximum current threshold Imax can be adjusted even when the load changes between iterations of the Imax setting process S80, and the motor can be driven more reliably.

A setting appropriate to various conditions, including the size of the hands attached to the movement, changes in temperature, and load changes, can therefore be selected and the motor can be reliably driven.

Other Embodiments

The invention is not limited to the embodiments described above, and can be modified and improved in many ways without departing from the scope of the accompanying claims.

Figure 15:
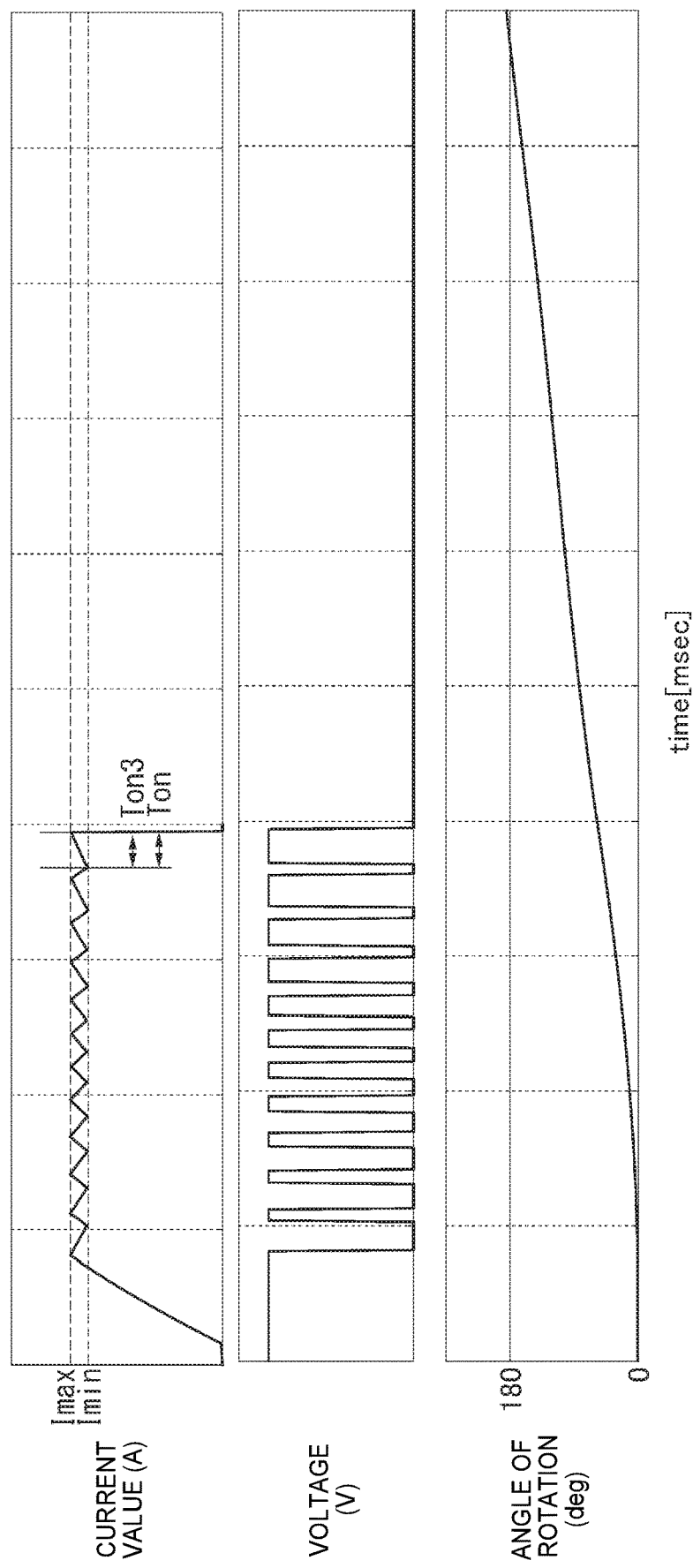
FIG. 15 is a graph of change in the current, voltage, and angle of rotation in another embodiment.

For example, changing the polarity is evaluated according to the off time Toff in the embodiments described above, but when the load is low, polarity changes can be determined according to the on time Ton. More specifically, when the load during use is known to be lower than a specific value, or when the load is confirmed to be low in the load evaluation process S20, S70, the driver 51 may be turned off, supply of drive current stopped, and polarity changed when the on time Ton is detected to be greater than or equal to threshold value Ton3 as shown in FIG. 15. Because the on time Ton is greatest near the neutral point where the pull-in torque of the stator is lowest, rotation of the rotor to near the neutral point can be detected by appropriately setting the threshold value Ton3 through tests, for example.

The neutral point is at approximately 60 degrees when the rotor turns from 0 degrees to 180 degrees. If the rotor turns past the neutral point, the rotor can turn by inertia to the point where the next pull-in torque is greatest, that is to a position turned 180 degrees from the starting point even if drive current is not output. Therefore, the driver 51 can be turned off more quickly than when detection of the rotor near 180 degrees is detected based on the off time Toff, and power consumption can be further reduced.

The foregoing embodiments compare the on time Ton with threshold values Ton1 and Ton2 to set the value of the maximum current threshold Imax, which is a control parameter, but the off time Toff may be compared with threshold values to set the value of the maximum current threshold Imax as a control parameter. More specifically, when the load on the motor 13 increases, the change in magnetic flux becomes gradual, the back electromotive force decreases, and as a result current drops more easily when voltage is not applied. Particularly past the neutral point, the off time Toff during current control is shorter than when the load is small.

Conversely, when the load on the motor 13 decreases, the off time Toff increases. Therefore, the off time Toff instead of the on time Ton may be compared with a specific threshold value and the size of the load estimated to set the value of the maximum current threshold Imax, which is a control parameter.

The value of the maximum current threshold Imax is set as a control parameter in the embodiments described above, but the value of the minimum current threshold Imin may be set.

The evaluation time t2 of the off time Toff used to evaluate a polarity change may also be used as a control parameter. For example, when the load is determined to be high, the length of the evaluation time t2 may be increased, and when the load is determined to be low, the length of the evaluation time t2 may be decreased.

The control parameters maximum current threshold Imax, minimum current threshold Imin, and the evaluation time t2 of the off time Toff may also be set according to the length of the elapsed time Tc from the start of drive current supply until the off time Toff exceeds the evaluation time t2 used as a parameter for determining a polarity change.

More specifically, as shown in FIG. 7, the elapsed time Tc increases when the load on the motor 13 is high, and as shown in FIG. 8, the elapsed time Tc decreases when the load on the motor 13 is low. Therefore, if the elapsed time Tc to a polarity change is compared with a specific value Tc1 and Tc≥Tc1, the load is great and the maximum current threshold Imax may be increased, and if Tc<Tc1, the load is small and the maximum current threshold Imax may be decreased, for example.

The elapsed time Tc may also be compared with two specific values Tc1 and Tc2, and the maximum current threshold Imax set in three levels. For example, if Tc1<Tc2, and Tc<Tc1, then Imax=C; if Tc1≤Tc<Tc2, Imax=B; and if Tc≥Tc2, then Imax=A.

In the second embodiment above the maximum current threshold Imax is set in the Imax setting process S80, and the maximum current threshold Imax is also set according to the value of count Nonoff, but the maximum current threshold Imax may be adjusted only by the Imax setting process S80 and not adjusted based on the count Nonoff.

As described above, the second embodiment adjusts the maximum current threshold Imax based on count Nonoff of on states and off states, which is the sum of the count Non of driver 51 on states and the count Noff of driver 51 off states. However, either one of the count Non of on states and the count Noff of off states may be compared with a specific threshold value to adjust the maximum current threshold Imax.

The foregoing embodiments compare the current I flowing through the coil 130 with a maximum current threshold Imax and a minimum current threshold Imin to control the on states and off states of the driver, but the invention is not so limited.

For example, a configuration that sets only the maximum current threshold Imax, and controls the driver to the on state when a previously set time has past after the current I exceeds the maximum current threshold Imax and the driver turns off is also conceivable. In this case, because the off time Toff is a constant, previously set time, a change in load may be evaluated based on a parameter other than the off time Toff, such as the on time Ton.

Further alternatively, a configuration that sets only the minimum current threshold Imin, and controls the driver to the off state when a previously set time has past after the current I goes below the minimum current threshold Imin and the driver turns on, is also conceivable. In this case, because the on time Ton is a constant, previously set time, a change in load may be evaluated based on a parameter other than the on time Ton, such as the off time Toff.

A CPU 23 controls the driver 51 in the embodiments described above, but the driver 51 may be controlled by a logic circuit. When the driver controller is configured by a logic circuit, power consumption can be reduced compared with a configuration using a CPU 23. The CPU 23 may also be configured by a single IC chip or multiple chips.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An electronic timepiece comprising:
   a motor having a coil;
   a driver that is controlled to an on state supplying drive current to the coil, and an off state not supplying the drive current;
   a driver controller configured to control the driver to the on state or the off state based on a control parameter and current value through the coil; and
   a control parameter setter configured to maintain or change the control parameter based on the on state or the off state control state of the driver controller,
   wherein the driver controller includes
      a maximum current detector configured to compare a current value through the coil and a maximum current threshold value, and detect whether or not the current value exceeds the maximum current threshold value, and
      a minimum current detector configured to compare a current value through the coil and a minimum current threshold value, and detect whether or not the current value is below the minimum current threshold value,
      controls the driver to the off state when the maximum current detector detects the current value exceeds the maximum current threshold value,
      controls the driver to the on state when the minimum current detector detects the current value is less than the minimum current threshold value,
      changes a polarity of the drive current when an on time, which is a continuous time of the on state of the driver, or an off time which is a continuous time of the off state of the driver, corresponds to a previously set change polarity condition, and an elapsed time from when the driver controller starts supplying the drive current to the driver until the change polarity condition is met is greater than or equal to a threshold value,
   the control parameter is the maximum current threshold value or the minimum current threshold value; and
   the control parameter setter maintains or changes the control parameter based on the on time or the off time.

2. The electronic timepiece described in claim 1, wherein:
   the control parameter is the maximum current threshold value.

3. The electronic timepiece described in claim 1, wherein:
   the control parameter is the minimum current threshold value.

4. The electronic timepiece described in claim 1, wherein:
   the control parameter setter increases the maximum current threshold value when the on time or the off time corresponds to the previously set change polarity condition, and the elapsed time is less than a threshold value.

5. The electronic timepiece described in claim 1, wherein:
the control parameter setter decreases the maximum current threshold value when a count of the on states and the off states until the elapsed time is greater than or equal to a threshold value is less than a first count, and increases the maximum current threshold value when a count of the on states and the off states until the elapsed time is greater than a second count, which is set greater than or equal to the first count.

6. The electronic timepiece described in claim 1, wherein:
the control parameter setter is operated at a specific time interval and executes a setting process of the control parameter until a stop signal to stop driving the motor is input.

7. A timepiece mechanism comprising:
a motor having a coil;
a driver that is controlled to an on state supplying drive current to the coil, and an off state not supplying the drive current;
a driver controller configured to control the driver to the on state or the off state based on a control parameter and current value through the coil; and
a control parameter setter configured to maintain or change the control parameter based on the on state or the off state control state of the driver controller,
wherein the driver controller includes
 a maximum current detector configured to compare a current value through the coil and a maximum current threshold value and detect whether or not the current value exceeds the maximum current threshold value, and
 a minimum current detector configured to compare a current value through the coil and a minimum current threshold value, and detect whether or not the current value is below the minimum current threshold value,
 controls the driver to the off state when the maximum current detector detects the current value exceeds the maximum current threshold value,
 controls the driver to the on state when the minimum current detector detects the current value is less than the minimum current threshold value, and
 changes a polarity of the drive current when an on time which is a continuous time of the on state of the driver, or an off time, which is a continuous time of the off state of the driver, corresponds to a previously set change polarity condition, and an elapsed time from when the driver controller starts supplying the drive current to the driver until the change polarity condition is met is greater than or equal to a threshold value,
the control parameter is the maximum current threshold value or the minimum current threshold value; and
the control parameter setter maintains or changes the control parameter based on the on time or the off time.

8. A motor control circuit comprising:
a driver that is controlled to an on state supplying drive current to a coil of a motor, and an off state not supplying the drive current;
a driver controller configured to control the driver to the on state or the off state based on a control parameter and current value through the coil; and
a control parameter setter configured to maintain or change the control parameter based on the on state or the off state control state of the driver controller,
wherein the driver controller includes
 a maximum current detector configured to compare a current value through the coil and a maximum current threshold value, and detect whether or not the current value exceeds the maximum current threshold value, and
 a minimum current detector configured to compare a current value through the coil and a minimum current threshold value, and detect whether or not the current value is below the minimum current threshold value,
 controls the driver to the off state when the maximum current detector detects the current value exceeds the maximum current threshold value,
 controls the driver to the on state when the minimum current detector detects the current value is less than the minimum current threshold value, and
 changes a polarity of the drive current when an on time, which is a continuous time of the on state of the driver, or an off time, which is a continuous time of the off state of the driver, corresponds to a previously set change polarity condition, and an elapsed time from when the driver controller starts supplying the drive current to the driver until the change polarity condition is met is greater than or equal to a threshold value,
the control parameter is the maximum current threshold value or the minimum current threshold value; and
the control parameter setter maintains or changes the control parameter based on the on time or the off time.

9. An electronic timepiece comprising:
a motor having a coil;
a driver that is controlled to an on state supplying drive current to the coil, and an off state not supplying the drive current;
a maximum current detector configured to compare a current value through the coil and a maximum current threshold value, and detect whether or not the current value exceeds the maximum current threshold value;
a minimum current detector configured to compare a current value through the coil and a minimum current threshold value, and detect whether or not the current value is below the minimum current threshold value;
a driver controller configured to execute:
 first processing that controls the driver to the off state from the on state when the maximum current detector detects the current value exceeds the maximum current threshold value;
 second processing that controls the driver to the on state from the off state when the minimum current detector detects the current value is less than the minimum current threshold value;
 determining processing that measures an on time, which is a continuous time of the on state of the driver, or an off time, which is a continuous time of the off state of the driver, and determines whether or not the on time or the off time meets a previously set change polarity condition; and
 changing polarity processing that changes a polarity of the drive current when it is determined that the on time or the off time has met the previously set change polarity condition;

the first processing and the second processing being repeated until the previously set change polarity condition is met; and a control parameter setter configured to maintain or change the maximum current threshold value or the minimum current threshold value based on the measured on time or the measured off time;

wherein the driver controller executes the first processing and the second processing using the changed maximum current threshold value or the changed minimum current threshold value.

* * * * *